United States Patent [19]

Hansare

[11] Patent Number: 5,566,915
[45] Date of Patent: Oct. 22, 1996

[54] STAND AND ACCESSORY FOR STAND

[76] Inventor: Lars Hansare, 1 Rue du Picardeau, Nemours, France, 77140

[21] Appl. No.: 374,771
[22] PCT Filed: Oct. 22, 1993
[86] PCT No.: PCT/GB93/02176
  § 371 Date: Feb. 8, 1995
  § 102(e) Date: Feb. 8, 1995
[87] PCT Pub. No.: WO94/09307
  PCT Pub. Date: Apr. 28, 1994

[30] Foreign Application Priority Data

Oct. 22, 1992 [SE] Sweden ................................ 9203106

[51] Int. Cl.⁶ .................................................. F16M 11/20
[52] U.S. Cl. ...................... 248/188.8; 248/351; 248/688; 369/428
[58] Field of Search ................... 248/188.8, 188, 248/188.5, 688, 128, 148, 151, 150, 346.03, 346.06, 346.5, 351, 354.1, 354.4; 354/81, 82, 293

[56] References Cited

U.S. PATENT DOCUMENTS

| | | | |
|---|---|---|---|
| 2,668,682 | 2/1954 | Dalton | 248/188.5 X |
| 2,750,141 | 6/1956 | Tobias | 248/414 |
| 4,007,554 | 2/1977 | Helmstadter | 42/94 |
| 4,987,912 | 1/1991 | Taylor | 248/351 X |
| 5,002,252 | 3/1991 | Setala et al. | 248/533 |
| 5,297,771 | 3/1994 | Gilbert | 248/688 |

FOREIGN PATENT DOCUMENTS

| | | |
|---|---|---|
| 1075009 | 10/1954 | France . |
| 2208540 | 6/1974 | France . |
| 2519112 | 7/1983 | France . |
| 2612281 | 9/1988 | France . |

Primary Examiner—Ramon O. Ramirez
Attorney, Agent, or Firm—Fay, Sharpe, Beall, Fagan, Minnich & McKee

[57] ABSTRACT

The invention relates to a monopod, particularly for cameras, with improved stability. A prop section is hinged at one end to a leg at a point between its ends to enable pivotal movement in a plane parallel to the leg of the stand, between a transport position folded in against the leg of the stand and an extended operating position. A base plate is hinged to the other end of the prop section for pivotal movement in a plane coinciding with the pivotal plane of the prop section.

18 Claims, 4 Drawing Sheets

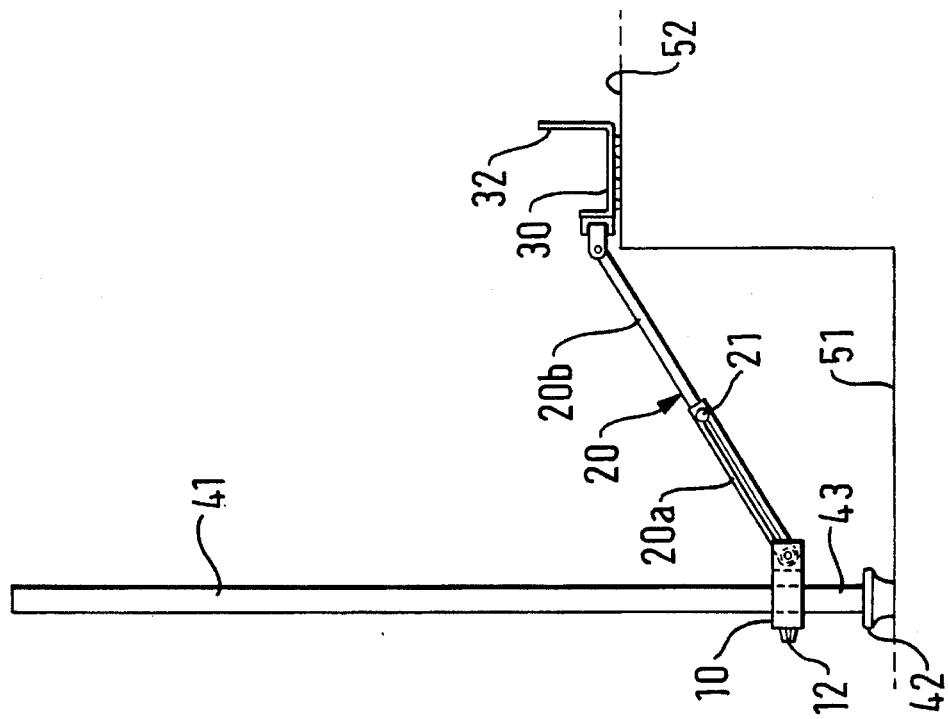
FIG. 7b
FIG. 7a
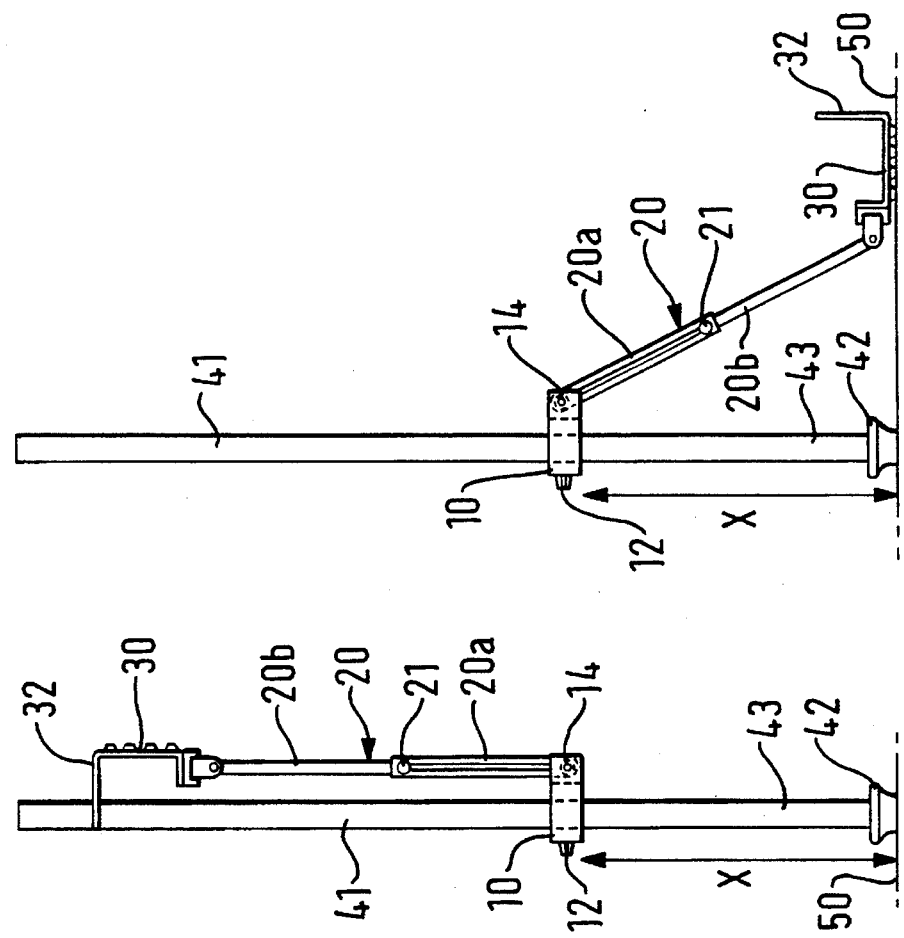
FIG. 6

STAND AND ACCESSORY FOR STAND

The present invention relates to a stand. More specifically the invention relates to a monopod with improved stability. The invention also relates to an accessory for fitting onto a stand to improve stability.

Known camera stands can be divided into two main groups: tripods and monopods. Tripods are advantageous from the stability point of view, but are generally relatively bulky and heavy to move/transport, as well as being complicated to set up, particularly on uneven surfaces or surfaces which are not horizontal. Tripods also require a relatively large surface on which the legs can be spread out.

Monopods, on the other hand, weigh little and take up little space during transport, are quick to set up, easy to move with a camera attached while work is in progress, can be placed on substantially any surface and only require a small area.

These advantages of monopods are obtained, however, at the expense of the good stability of tripods. This instability of monopods is a great problem, particularly when filming/photographing with long focal distances, since even an extremely small displacement of the stand, in the magnitude of only a few millimeters, may cause a many time greater, often unacceptable, displacement of the picture.

Monopods also have the drawback that the user must hold onto the stand or the camera fitted thereon the whole time he is working in order to prevent the stand tipping over.

In addressing these drawbacks of the known stands the object of the present invention is to achieve a stand with good stability, which is simple and quick to set up, easy to move while working, has low weight, is not bulky, can be placed on a small area on a surface that is not necessarily flat, and which will not fall over even if no longer being held in the hands.

Accordingly a first aspect of the invention comprises a steadying device for use with a one-legged stand such as a camera monopod, the device comprising a clamp adapted to fit around the monopod leg, a prop section having one end connected to the clamp, and a base plate connected to the other end of the prop section, whereby, in use, the clamp is connected to a point along the length of the monopod leg and the base plate placed on the ground so that the user can steady the assembly by placing his foot on it.

The invention also extends to a monopod including a steadying device comprising a prop one end of which is pivotally connected to the monopod, and having a footplate pivotally connected to the other end, whereby the prop and the footplate can be folded parallel to the monopod for transport purposes.

In a preferred embodiment of the invention the leg of the stand is provided with a pivotable link-arm with a hinged attached. The link-arm is connected by one end of the leg at a point between its ends to enable pivotal movement in a plane parallel with the leg of the stand between a transport position folded in against the leg of the stand and an extended, operating position, and that the base plate is hinged to the other end of the link-arm for pivotal movement in a plane coinciding with the pivotal plane of the link-arm.

In transport position the link-arm and base plate may preferably be folded against the leg of the stand, aligned with each other and parallel to the leg of the stand.

In operating position the link-arm is normally directed obliquely down towards the surface on which the lower end of the leg stands whereupon, thanks to its freedom of movement in relation to the link-arm, the base plate can be applied on the ground surface and held there by the user's foot.

In the operating position described above i.e. when the link-arm is directed obliquely down towards the underlying surface, the leg of the stand, the link-arm and the underlying surface form a stabilizing triangle which, if the stand is situated vertically on a flat surface, constitutes a right-angled triangle.

In operating position the link-arm may also be directed obliquely upwards or at right angles out from the leg of the stand. This may be useful on uneven surfaces, such as stairs. The lower end of the leg can be applied, for instance, on the lower of two stairs and the base plate on the step above.

In a preferred embodiment the stand is also provided with a locking device to secure the link-arm at an angle to the leg of the stand. Locking the link-arm in relation to the leg of the stand in this way also indirectly locks the angle of the link-arm in relation to the base plate held firmly against the support surface. The .pn 3 stabilizing triangle mentioned above is thus effectively fixed. Such a locking device for the link-arm can be designed in several ways, such as by means of a tension screw at the pivot axis between link-arm and stand leg.

The leg of the stand can preferably be telescoped in known manner, but since the pivot axis of the link-arm is usually located relatively low down on the expanded leg, it is preferable if the lower telescope section has the largest diameter and is arranged outermost so that this lowermost telescope section can support the link-arm without being impeded by the other telescope sections. Another advantage of the lowermost telescope section being arranged outermost is that dirt may adhere to the lowermost telescope section is not carried into the other telescope sections.

Accordingly to a particularly preferred embodiment the link-arm is connected to the stand via an attachment fitted displaceably on the leg, which can be locked at the desired level, e.g. by means of a tension screw passing against the leg of the stand.

These and other embodiments of the stand according to the invention are revealed in the appended claims and in the following detailed description.

The invention relates in a first aspect to a stand with stabilizing accessory (link-arm+base plate) as described above, and in a second aspect to only the accessory itself for assembly on an existing stand.

The invention will now be described in more detail in a preferred embodiment by way of example, with reference to the accompanying drawings.

FIGS. 6, 7a and 7b show diagrammatic side views of a monopod with stabilizing accessory fitted, FIG. 6 showing the stand in transport position and FIGS. 7a and 7b showing the stand in two different operating positions.

Figure 1:
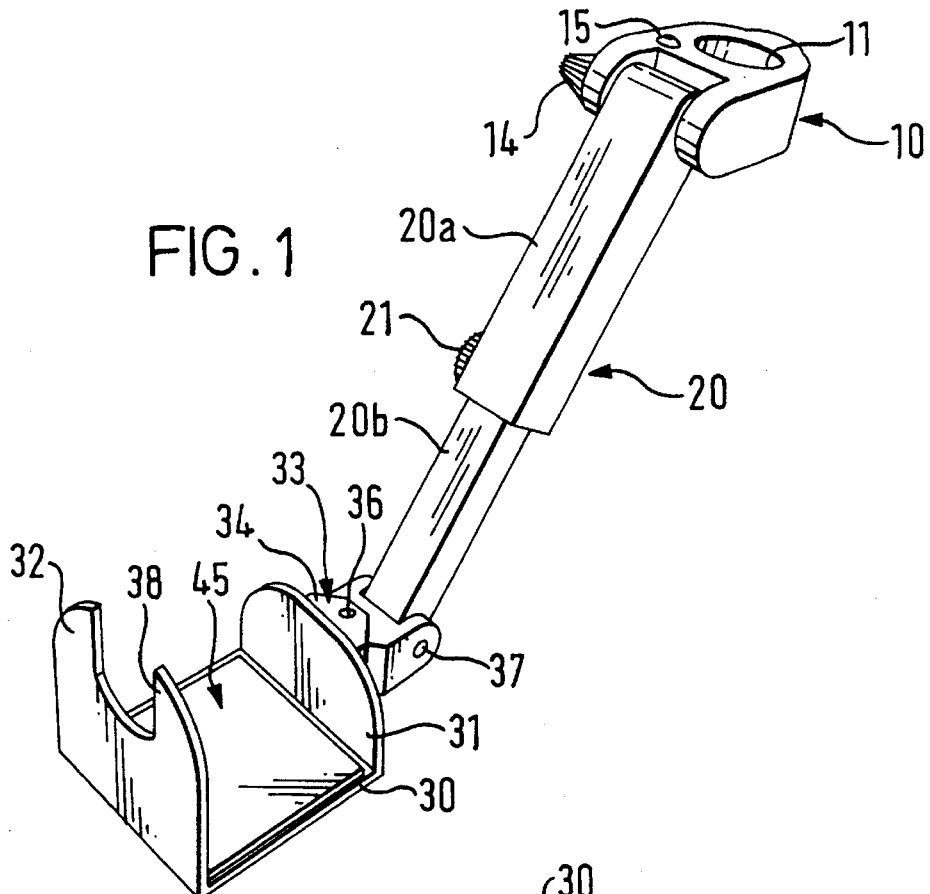
FIG. 1 shows in perspective from above an embodiment of a stand accessory according to the invention.
Figure 2:
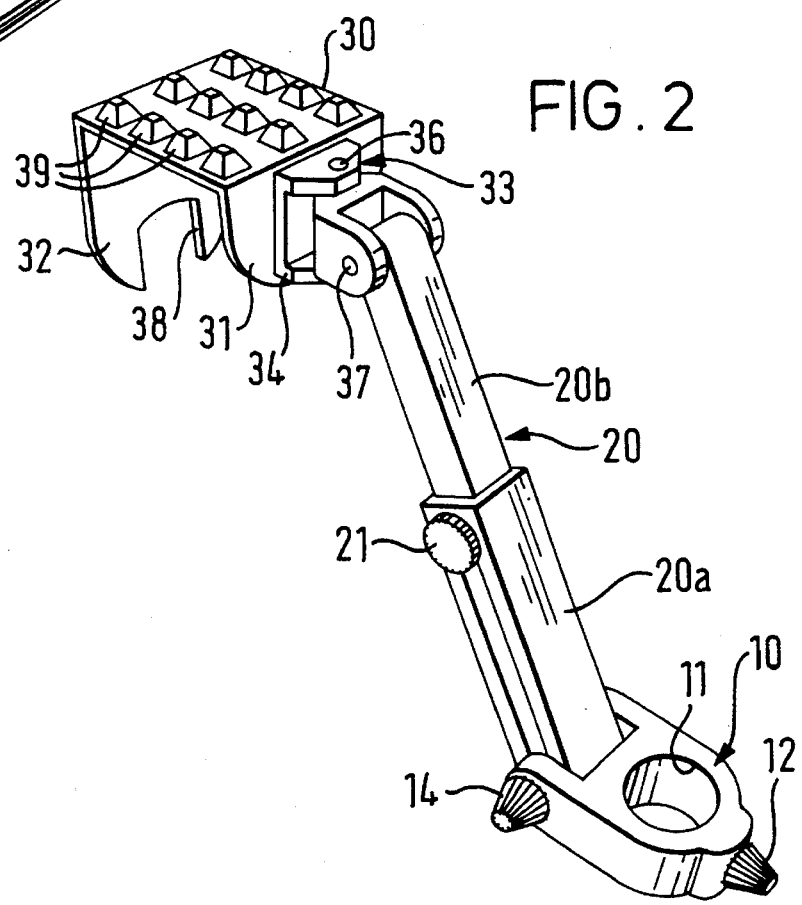
FIG. 2 shows the stand accessory in FIG. 1 seen in perspective from below.

In FIGS. 1 and 2 an embodiment of the stand accessory according to the invention is shown in perspective by way of example. The accessory comprises an attachment 10, a link-arm 20 and a base plate 30.

3

The attachment 10 consists of a frame with a circular aperture 11 for receipt of a tubular stand-leg with corresponding diameter (not shown in FIGS. 1 and 2). A tension screw 12 at one side of the attachment permits the attachment 10 to be clamped on the leg of the stand at the desired level. A link-arm 20 is hinged about a first axis 13 at the opposite side of the attachment 10 (see FIG. 3) to permit swinging movement in a plane coinciding with the leg of the stand. A second tension screw 14 on the axis 13 enables the link-arm 20 to be clamped at the desired angle in relation to the attachment 10.

The attachment 10 is also provided on its upper side with a levelling means in the form of a circular level 15. This level, visible from above, simplifies exact vertical positioning of the stand.

In the embodiment shown, the link-arm 20, which may be made of metal, has a first arm section 20a connected by a hinge to the attachment 10 and a second arm section 20b connected by a hinge to the base plate 30, and can therefore be telescoped. A tension screw 21 is provided on one side of the link-arm 20 to adjust the length of the link-arm, the two arm sections 20a and 20 thereby being locked in relation to each other. Such a locking construction is simple to achieve in many different ways for one skilled in the art and is therefore not described in any further detail.

The base plate 30 is made in one piece with two end walls 31 and 32 forming a U-section. The distance between the end walls 31 and 32 is designed to fit the width of a foot, preferably slightly larger. One end wall 31 is somewhat lower than the other end wall 32.

The lower end wall 31 is provided externally with a universal joint, generally designated 33. This universal joint 33 comprises a clamp 34 permanently secured to the end wall 31, and a joint place 35 between the clamp and the link-arm section 20b. The joint piece 35 is freely pivotable about a shaft 36 located in the clamp, perpendicular to the base plate, and also freely pivotable about a pivot axis 37 connecting it to the link-arm section 20b, said axis 37 being parallel to the hinge axis 14.

The higher end wall 32 on the opposite side of the base plate is provided with a U-shaped notch 38 cut in it and extending downwards to approximately the level of the upper edge of the lower end wall 31.

The bottom of the base plate 30 is provided with anti-friction means in the form of a studded rubber mat 39, and the top side is provided with a smooth rubber mat 45.

Figure 3:
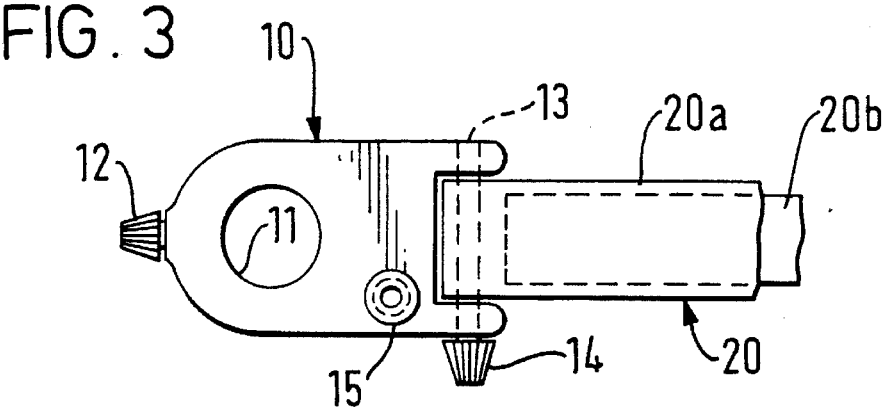
FIG. 3 shows a diagrammatic top view on a larger scale of an attachment in the accessory according to FIGS. 1 and 2, and also a part of the link-arm.

FIG. 3 shows diagrammatically an attachment 10 and part of the link-arm 20 seen from above.

Figure 4:
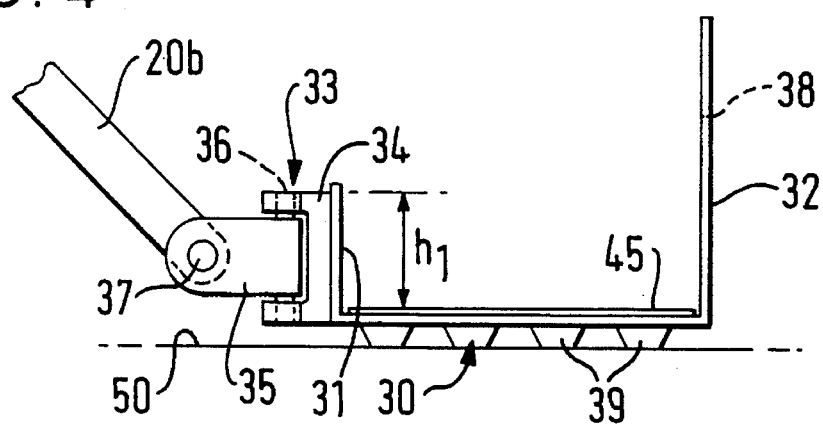
FIG. 4 shows a diagrammatic side view on a larger scale of a base plate of the accessory according to FIGS. 1 and 2 and also part of the link-arm.

FIG. 4 shows diagrammatically the base plate 30 and part of the link-arm 20 seen from the side, a support surface being indicated by the reference designation 50.

Figure 5A:
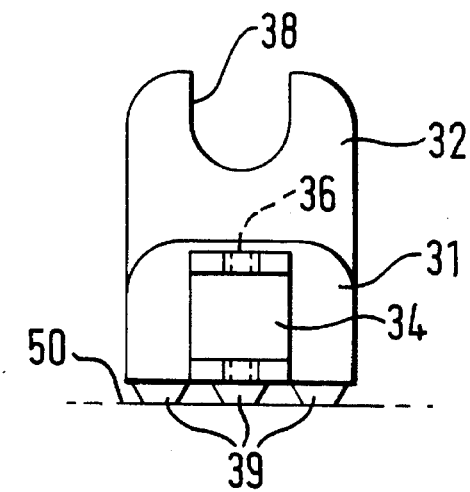
FIGS. 5a and 5b show diagrammatic views of opposite end walls of the base plate.
Figure 5B:
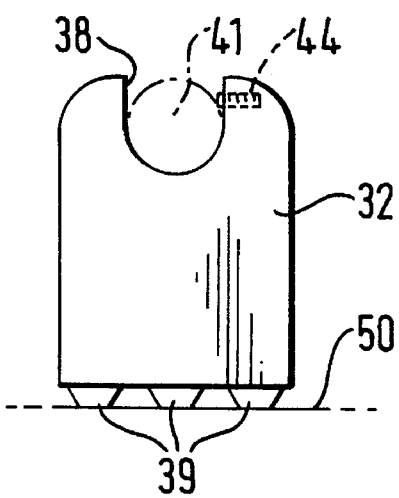

FIGS. 5a and 5b show diagrammatically the end walls 31 and 32 of the base plate 30.

The use and advantages of the stand accessory according to FIGS. 1 and 5 will now be described in more detail with reference to FIGS. 6 and 7. The reference designation 41 denotes the lower telescope section of the leg of a telescopic monopod, such as a camera stand. The reference designation 42 denotes a rubber cup or the like fitted on the bottom end 43 of the telescope section 41 in contact with a surface 50.

The stand has preferably two or more tubular leg sections that telescope into each other, the lower one, 41, being arranged outermost.

The attachment 10 is fitted on the telescope section 41 at a distance X from the lower end 43. The distance X can easily be adjusted by unscrewing the tension screw 12 and moving the attachment 10. The distance X is normally less than the length of the link-arm 20. If necessary the attachment 10 and thus the entire accessory can be dismantled from the stand.

4

FIG. 6 shows the accessory in transport position, the link-arm 20 being folded against the telescope section 41 of the stand. The base plate 30 is now substantially aligned with the link-arm 20. The height h1 (see FIG. 4) of the lower end wall 31 of the base plate should be small enough to permit the link-arm 20, when folded for transport to lie substantially parallel to the telescope section 41, as shown in FIG. 6.

The link-arm 20 and base plate 30 are locked in the folded position shown in FIG. 6 by the telescope section 41 being inserted into the notch 38 in the end wall 32 of the base plate 30. This is also shown in FIG. 5b. To retain the base plate against the telescope section 41 of the stand, friction engagement may be provided between the telescope section 41 and the notch 38. However, a restraining member, e.g. in the form of a spring-loaded locking pin 44 as shown in FIG. 5b is preferably provided to hold the two parts together. The tension screw 14 on the attachment 10 may also be tightened in transport position.

FIG. 7a shows a first operating position with the stand placed on a flat, horizontal surface 50. The link-arm 20 has been folded down to slope against the surface 50, possibly after loosening the tension screw 14, whereupon the base plate 30 pivots about the axis 37 to lie parallel with the surface 50. The vertical position of the attachment 10 on the telescope section 41 need not normally be altered. The user can now place one foot on the base plate 30 between the end walls 31 and 32. With a suitable distance between the end walls, the user can effectively secure his/her foot in relation to the base plate 30 by placing it at an oblique angle.

The stand 40 can be adjusted vertically with the aid of the level 15 before and/or after the foot has been placed on the base plate 30.

Finally, the angle of the link-arm 20 is locked by tightening the tension screw 14.

The monopod is now extremely stable. In fact a stability function almost equivalent to a traditional tripod is obtained, since the lower end 43 of the stand 40 constitutes a first stability point, the base plate 30 a second stability point and the user's foot, forming the third corner of a triangle, a third stability point.

Another advantage is that, if necessary, the user can release his/her manual hold on the stand without it falling, thanks to the base plate 30 which is firmly held against the surface below.

FIG. 7b shows an alternative operating position with the stand placed on an uneven surface, in this case two steps of a staircase. The lower end 43 of the stand tube 41 has been applied on the lower step 51. The attachment 10 has been moved further down than in FIG. 7a. The link-arm 20 has been folded out from the transport position at an elevated angle. The base plate 30 has been brought into horizontal contact with the upper step 52.

It will be realised that the embodiment described above can be varied in many ways without departing from the inventive concept as defined in the claims.

The separate attachment 10, for instance, is not absolutely necessary. Instead the link-arm 20 may be connected to a shaft made in one piece with the telescope section 41, or the hinge axis 14 of the link-arm 20 may be arranged on one of the tension sleeves traditionally located at the end of each telescope section on a telescopic stand.

In a simpler embodiment the link-arm 20 need not be telescopic and the universal joint 34–37 between link-arm 20 and base plate 30 can be replaced with a simple hinge permitting movement of the base plate 30 only in the pivotal plane of the link-arm 20.

The end walls 31 and 32 of the base plate may possibly be simplified, the link-arm 20 being connected directly via a pivot axis 37 to one side edge of the base plate 30.

Figure 8:
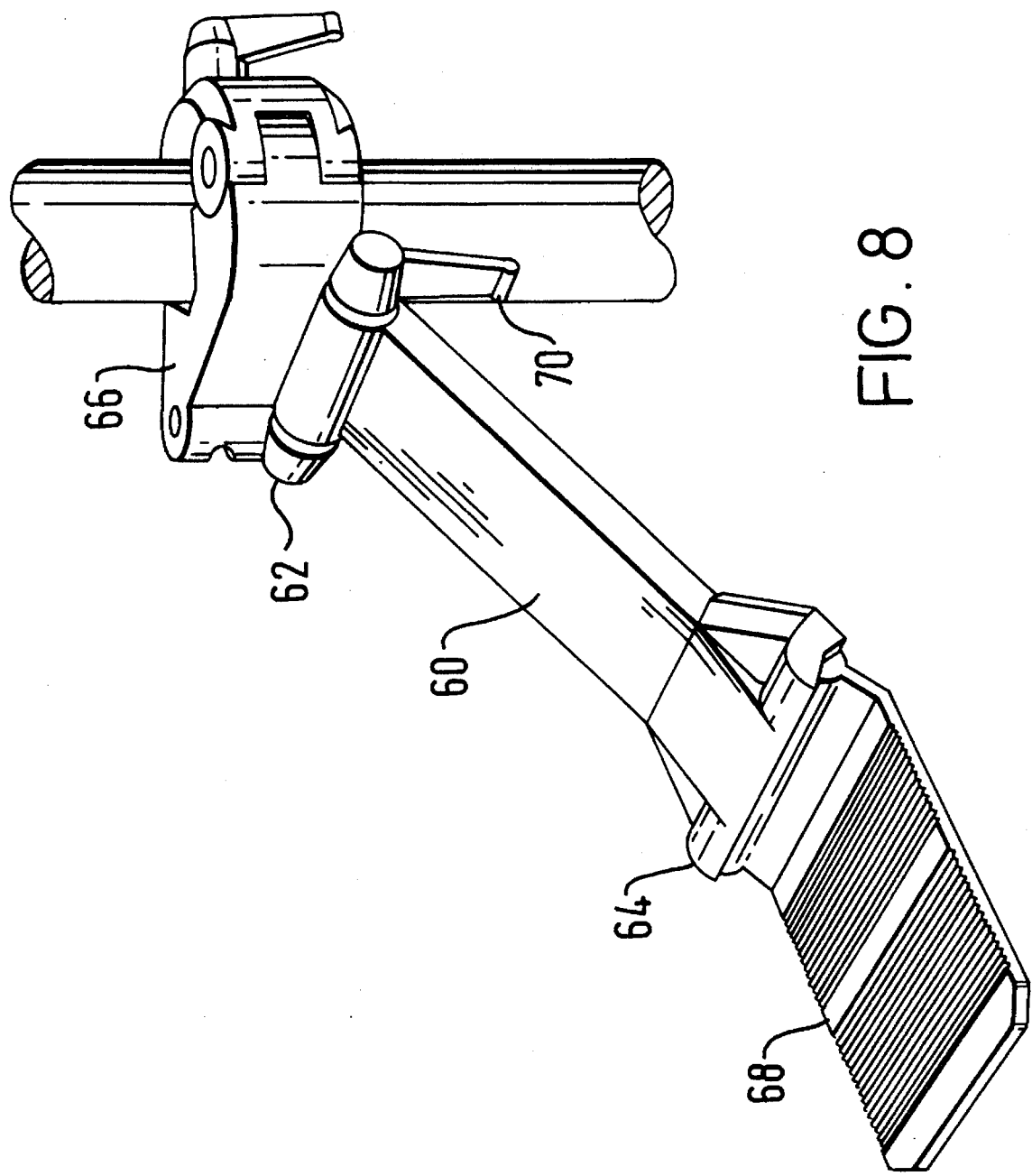
FIG. 8 is a perspective view of a second embodiment.

One possible simplified form of the invention is shown in FIG. 8 in which the link-arm is formed as a solid strut, and simple hinge joints 62 and 64 respectively connect it to the clamp 66 at the upper end and to the footplate 68 at the lower end. In this case the footplate is not provided with end walls, but the hinge 62 is provided with a simple locking device having a lever 70 to hold it in position. The clamp 66 is constructed as a pair of hinged jaws which can be closed and locked around the monopod leg.

It is also feasible to arrange two folding supports on a monopod, one for each foot. In this case, each of the two link-arms may be supported by its own attachment or both by a common attachment.

Finally, it should also be observed that the monopod is also easier to hold even in non-vertical positions, thanks to this stabilizing accessory.

I claim:

1. A steadying device for use with a one legged stand or "monopod", the device comprising:

a prop section having an upper end and a lower end;

a baseplate connected to said lower end of said prop section, the baseplate having an upwardly facing surface forming a footplate for steadying the assembly;

a clamp connected to said upper end of said prop section and adapted to fit around the one legged stand; and, a pivot connecting said clamp to said prop so that the monopod and the prop can be folded into a parallel relationship for transport purposes.

2. A photographic monopod having a steadying device according to claim 1.

3. A steadying device according to claim 1 in which the clamp includes a releasable locking device.

4. A steadying device according to claim 1 in which the prop is telescopic.

5. A steadying device according to claim 1 in which the clamp is provided with levelling means.

6. A steadying device according to claim 1 in which the base place is connected to the prop section by means of a double pivot joint comprising a link having a first pivot with a vertical axis, connecting it to the footplate, and a second pivot with a horizontal axis connecting it to the prop, the horizontal axis extending perpendicularly to the axis of the prop.

7. A steadying device according to claim 1 in which the baseplate has two opposed, upstanding end walls, the inner one of which is adjacent the end of the prop section.

8. A steadying device according to claim 7 in which the outer end wall is formed with a recess to co-operate with the monopod leg so that the prop and the leg can be folded together into a parallel position for transport.

9. A monopod including a steadying device comprising:

a prop having an upper end and a lower end, the upper end being pivotally connected to the monopod;

the prop also having a base plate pivotally connected to the lower end, whereby the prop and the base plate can be folded parallel to the monopod for transport purposes.

10. A monopod according to claim 9 in which the monopod leg is telescopic and comprises an outer section to which the prop is connected and an inner section which can be slid into the outer section for transport purposes.

11. A support construction comprising:

a monopod;

a prop having an upper end and a lower end;

a clamp connected to said prop upper end and adapted to fit around said monopod; and, a pivot connecting said clamp to said prop wherein in use, the prop can be oriented at an acute angle in relation to said monopod to stabilize same and wherein the prop can be folded into a parallel relationship with said monopod for transport purposes.

12. The construction of claim 11 further comprising a base plate connected to a lower end of said prop.

13. The construction of claim 12 further comprising a pivot connecting said baseplate to said prop lower end so that said baseplate can be folded into a parallel relationship with said prop for transport purposes.

14. The construction of claim 13 wherein said pivot connecting said baseplate to said prop comprises a double pivot joint having a link with a first pivot with the vertical axis connecting it to said baseplate and a second pivot with a horizontal axis connecting it to said prop, the horizontal axis extending perpendicularly to the axis of the prop.

15. The construction of claim 13 wherein said baseplate has two opposed upstanding end walls, one of which is adjacent to said prop.

16. The construction of claim 11 in which said clamp is slidably mounted on said monopod and wherein said clamp includes a releaseable locking device.

17. The construction of claim 11 wherein said prop is telescopic.

18. The construction of claim 11 wherein said clamp comprises a leveling means.

\* \* \* \* \*